United States Patent [19]
Brink

[11] 3,827,703
[45] Aug. 6, 1974

[54] RADIAL SHAFT SEAL WITH POSITIVE GARTER SPRING RETENTION

[75] Inventor: Robert V. Brink, Carpentersville, Ill.

[73] Assignee: Chicago Rawhide Manufacturing Company, Chicago, Ill.

[22] Filed: July 23, 1971

[21] Appl. No.: 165,058

[52] U.S. Cl................................ 277/153, 277/182
[51] Int. Cl............................................. F16j 9/06
[58] Field of Search......... 277/153, 27, 50, 52, 184, 277/164, 182

[56] References Cited
UNITED STATES PATENTS

| | | | |
|---|---|---|---|
| 2,871,037 | 1/1959 | Johnson et al. | 277/182 X |
| 2,893,770 | 7/1959 | Poncet | 277/182 |
| 2,926,035 | 2/1960 | Peickii et al. | 277/164 X |
| 3,392,226 | 7/1968 | McKinven, Jr. | 277/153 X |

FOREIGN PATENTS OR APPLICATIONS

| | | | |
|---|---|---|---|
| 949,916 | 9/1956 | Germany | 277/182 |

Primary Examiner—Samuel B. Rothberg

[57] ABSTRACT

A shaft seal having a radially acting garter spring disposed in a relatively shallow spring-retaining groove which extends radially from one side wall of a relatively narrow, axially extending annular recess in the elastomeric body portion of the seal unit. The invention substantially reduces or eliminates "pop-out" of the garter spring, without diminishing the tolerance of the seal to radial run-out. In addition, seals of the present invention are able to be made by a method which reduces or eliminates the incidence of actual or potential splits in the outer wall of the spring-retaining groove, which in the prior art, resulted from excessive seal distortion occurring in newly formed seals during axial separation of the mold parts.

1 Claim, 6 Drawing Figures

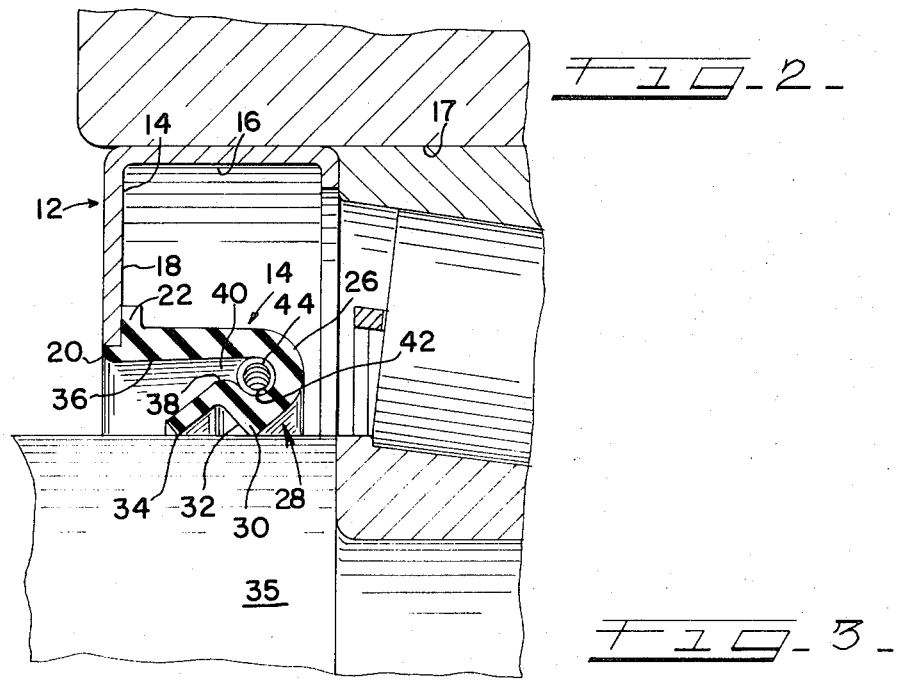
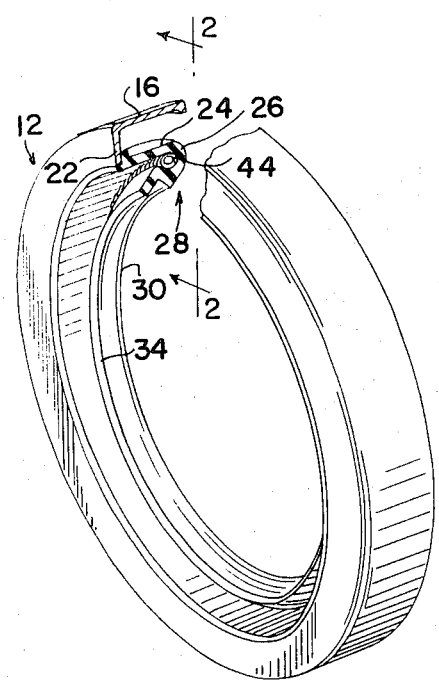
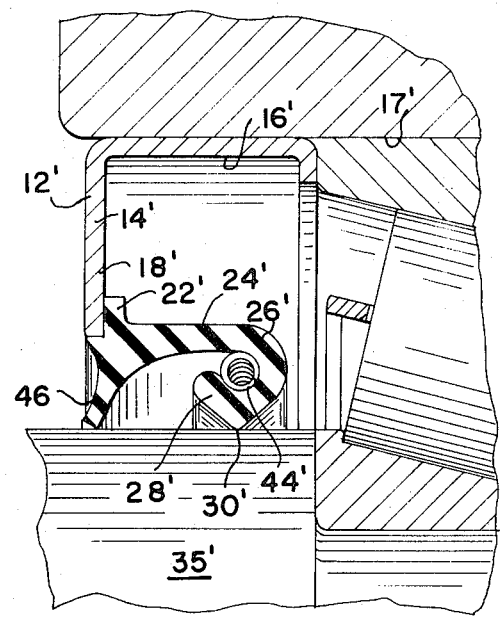
INVENTOR
ROBERT V. BRINK

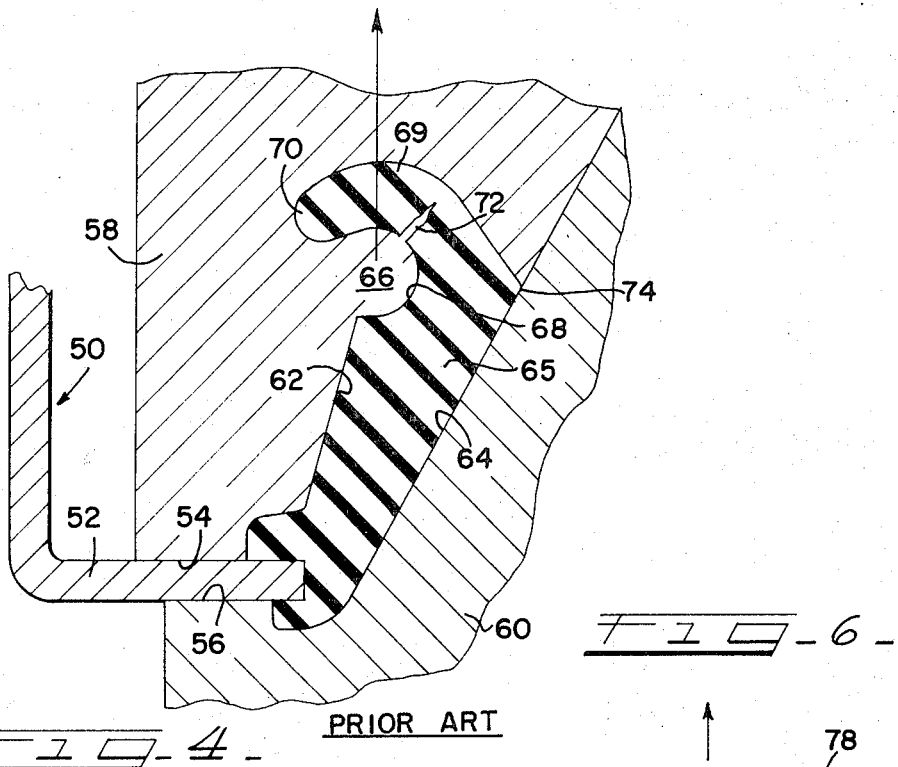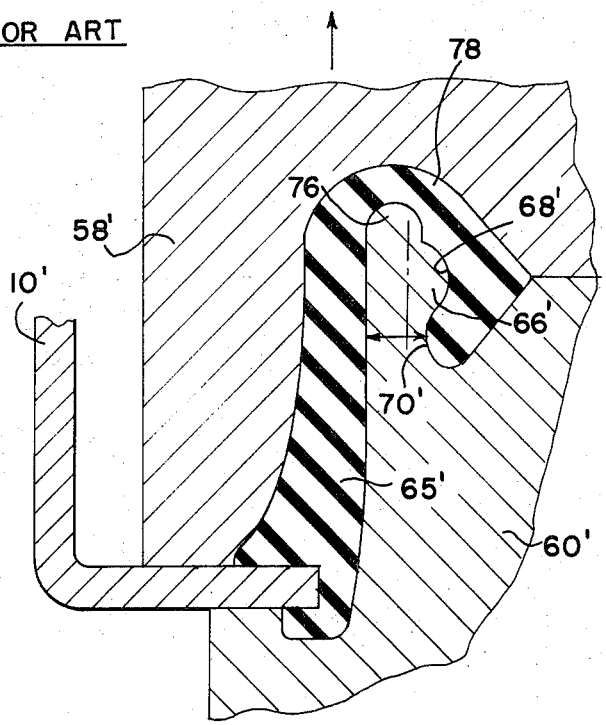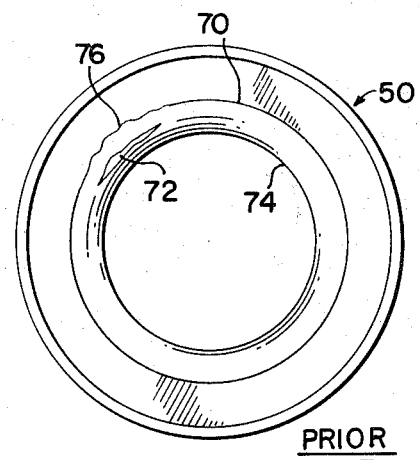

RADIAL SHAFT SEAL WITH POSITIVE GARTER SPRING RETENTION

BACKGROUND OF THE INVENTION

The present invention relates generally to improvements in shaft seals, and in particular, to radially acting shaft seals which include a rigid annular support element and a flexible seal-forming element which extends at least partially in an axial direction, and which includes a garter spring adapted to urge the sealing element radially into engagement with the shaft. The invention is embodied in the construction of seals having means for positively retaining a garter spring in place over a portion of the sealing lip. The preferred constructions are readily molded in such a manner that the garter spring retaining groove does not tend to split, or to have latent defects due to excessive stressing of the elastomer when the freshly molded sealing member is removed from the mold parts.

Radial seals comprising a metal casing and an elastomeric sealing member and utilizing a garter spring retained in a groove in the elastomeric sealing member are well known. Such seals are in widespread use and, when properly installed, have been found to provide highly satisfactory sealing characteristics. However, because of occasional inadvertent mishandling of seals and/or thin associated bearing assemblies, particularly during installation, there is a possibility that the garter spring does not desirably remain properly disposed in the spring-retaining groove of such seals after installation. For example, such bearing assemblies are sometimes dropped or jolted so severely that the garter spring pops out of the retaining groove. Hence, this problem is referred to in the trade as garter spring "pop-out." The importance of this problem can be realized when it is borne in mind that, after assembly, it is virtually impossible to determine, without dismantling the entire assembly, whether or not the garter spring has popped out. Therefore, because of the internal hidden positioning of the spring element, in most instances, there is no universally satisfactory inspection procedure by which the actual positioning of the garter spring can be determined subsequent to installation.

Consequences of garter spring pop-out include improper sealing action, shortened seal life, and damage to bearing assemblies due to lubrication failure or to entanglement between parts of the bearing and the loose garter spring.

A number of approaches have heretofore been attempted for the purpose of resolving the garter spring pop-out problem. It has been suggested that the spring be molded in place within the elastomeric sealing element. However, an imbedded garter spring does not provide the desirable operating characteristics which are achieved by independent springs freely disposed within a spring-retaining groove. The use of radially extending back-up casings has been suggested, but the back-up casings heretofore suggested do not positively prevent partial pop-out and mis-positioning of the spring. However, the use of a back-up casing does generally assure that the spring will not be completely separated from the elastomeric sealing element, and does assure that the errant spring does not become entangled with the bearing assembly or other internal operating parts.

Another approach to the solution of the garter spring pop-out problem has been to utilize deep radially extending spring-retaining grooves. However, the use of deeply extending radial grooves has been found, when using conventional molding practices, inherently to result in either actual structural defects or in latent or incipient structural defects in the mass-produced seals. For example, as will be explained more fully hereinafter, the polymeric material forming the seal element is shaped by molding surfaces on plural separable mold parts, and the molding surface and the newly formed sealing element are separated immediately after the sealing element is molded, and generally quite hot and perhaps incompletely cured. When the shaping mold surface includes a deeply extending undercut portion forming a deep spring-retaining groove, the outer portion of the spring-retaining groove must be severely stretched or distorted during separation, because the inner radial parts of the seal body must be stretched to extend over the radially outermost parts of the groove-forming mold surface.

In some instances, the portion of the wall of the spring-retaining groove adjacent the annular mouth is distorted so severely that the inner face thereof actually develops a crack or split. In other instances, the stressing is great enough to develop a weak end area or an incipient tear, which, however, is not usually visually discernible until after the sealing member has been put into use. For example, some polymeric silicone sealing materials, which are highly desirable because of their tendency to absorb lubricants and become self-lubricating, tend to swell slightly upon absorption of lubricants. The latent or incipient splits referred to above often develop into actual splits when the sealing member swells. Such structural defects are an undesirable but natural or inherent consequence of the pressure of deeply extending radial grooves formed in the usual manner.

Thus, each of the solutions or approaches hertofore suggested for better assuring retention of the garter spring presents shortcomings or defects and none of the approaches has proven entirely satisfactory.

In view of the foregoing, it is an object of the present invention to provide means for positive retention of a garter spring in its proper operating position on a radial shaft seal.

It is a further object of the present invention to provide a molding method and sealing element produced therefrom which does not so severely abuse the molded sealing element that actual, latent or incipient structural defects are unlikely to occur in the finished structure.

It is a further object of the present invention to provide a radial seal in which a relatively shallow spring-retaining groove extends radially from a side wall of a substantially axially directed annular recess in the elastomeric sealing element, and in which the side walls of the recess are closely enough spaced apart that the spring is retained within the annular recess, thus formed, even though the radially extending spring-retaining groove is relatively shallow.

It is another object of one form of the invention to provide a positive garter spring retention construction in which the spring-retaining portion opens into the space on the "dry side" of the primary seal.

The foregoing and other inherent objects and advantages of the invention are achieved by providing an oil seal construction wherein the garter spring is disposed within a relatively shallow, radially extending annular groove spaced slightly radially apart from an adjacent portion of the sealing element body. The manner in which these objects are attained will become more clearly apparent when reference is made to the accompanying detailed description of the preferred embodiments of the invention set forth by way of example and when reference is made to the accompanying drawings, wherein like reference numerals indicate corresponding parts throughout.

BRIEF DESCRIPTION OF THE DRAWINGS

FIG. 1 is a perspective view of an improved radial shaft seal made in accordance with the present invention;

FIG. 2 is a fragmentary enlarged vertical sectional view taken along lines 2—2 of FIG. 1;

FIG. 3 is a fragmentary enlarged vertical sectional view of an alternative embodiment of the invention;

FIG. 4 is a further enlarged vertical sectional view, with portions broken away, showing a prior art seal and the opening of an associated mold used to form such seals;

FIG. 5 is an end elevational view of a damaged prior art shaft seal made by a mold of the type illustrated in FIG. 4; and FIG. 6 is an enlarged fragmentary vertical sectional view showing a portion of the seal of the invention with an associated mold.

DESCRIPTION OF THE PREFERRED EMBODIMENTS OF THE INVENTION

Referring now to the drawings, and in particular to FIGS. 1 and 2, one preferred form of seal according to the invention is generally indicated at 10. The seal 10 comprises a rigid metal stamping generally indicated at 12 and an elastomeric sealing element generally indicated at 14. Stamping 12 comprises an axially extending mounting portion 16 which sealingly engages a bore 17, typically formed within a machine member, and also includes a continuous radially extending annular flange 18. The flexible sealing element 14 is bonded to the stamping 12 at the radially inner mouth 20 of the flange 18. The sealing element 14, in the embodiment illustrated in FIGS. 1 and 2, includes a base portion 22 which lies adjacent and is bonded to the flange 18, and also includes an axially extending portion 24 which extends from flange 18 in the same direction as the mounting portion 16 extends. At the remote end 26 of the axially extending portion 24, the elastomeric sealing element 22 turns radially inwardly, and thence extends axially in the reverse direction back towards flange 18. The reversed portion, generally indicated at 28, includes a primary sealing lip 30, a radially outwardly inclined portion 32, and an angularly extending secondary sealing lip 34. The primary sealing lip 30 sealingly engages a rotatable shaft 25 passing through the seal unit 10. A radially inwardly directed wall 36 of the collar 24 and an outwardly directed wall 38 of the reversed portion 28 are shown to be closely adjacently disposed side walls defining therebetween a substantially axially extending annular recess 40. A radially shallow, annularly extending groove 42 serves to seat a garter spring 44 within the side wall 38 of the collar 28. In the embodiment illustrated in FIG. 2, the spring-retaining groove 42 is intentionally made relatively shallow, and has a depth which is approximately equal to or smaller than the radius of the spring 44; also, the oppositely directed side walls 36, 38 of the recess 40 are spaced apart by a distance which is just less than the outside diameter of the spring 44.

The embodiment of the seal unit illustrated in FIG. 3 is an alternative embodiment having a number of obvious similarities to the structure shown in FIGS. 1 and 2. Consequently, similar portions and elements of the embodiment shown in FIG. 3, are identified by identical numbers used for corresponding portions and elements of FIG. 2, except that, in FIG. 3, the respctive portions and elements will be identified by primed numbers. It will be appreciated from a consideration of FIG. 3 that a secondary sealing lip 46 is provided which extends radially inwardly and somewhat axially outwardly from base portion 22', and that otherwise the structure shown in FIG. 3 is similar to that shown in FIG. 2. The secondary sealing lips 34 of FIGS. 1 and 2 correspond to the secondary lip 46 of FIG. 3; these elements are referred to variously as dry lips, dust lips, excluder lips, or the like.

Referring now to FIGS. 4, 5 and 6, an explanation of the advantages of the positive spring retention feature of the invention will be set forth. In the prior art, shown in FIG. 4, seals have been made in compression molds and have included deeply radially extending spring-retaining grooves.

Accordingly, as shown in FIG. 4, a metal casing generally indicated at 50 has included a radially extending flange portion 52, which is normally clamped between opposing faces 54, 56 of an upper mold member or plate 58 and a lower mold member or bottom plate 60, respectively. The top plate 58 has a cavity-defining, elastomer-shaping wall 62, and the bottom plate 60 has a cavity-defining shaping wall 64. The wall 62 includes a radially directed annular rib portion 66, which is semi-circular in cross-section and which shapes the being formed elastomer 65 to provide garter spring groove 68. In the configuration illustrated in FIG. 4, elastomer 65 extends radially outwardly around the rib portion 66 and terminates at the mouth 70 to provide an inner wall 69 of the garter spring groove 68. Under normal manufacturing conditions, elastomer 65 is simultaneously shaped, vulcanized and bonded to the stamping 50 in a semi-automatic compression or transfer molding operation in which the bottom plate 60 is typically stationary, and in which the top plate 68 moves axially of the seal (downwardly in FIG. 4) to engage elastomer 65 and flange 52. Suitable vents and escape ports for excess polymer (not shown) are conventionally provided.

The mold units as a whole are normally heated, and because of the combination of heat and pressure, the elastomer 65 is shaped and cured between shaping walls 62, 64, and automatically bonded to flange 52, as indicated in FIG. 4. After molding, the seal is removed when the top plate 58 is moved axially (in the direction indicated by the arrow in FIG. 4) to separate it from the flange 54 and the lower mold plate 60. Thereupon the portion of the elastomer 65 adjacent to and defining the mouth 70 must be forcibly withdrawn through the area between the wall 69 and the rib 66. In so doing, the elastomer 65 must be distorted considerably in the region under the arrow of FIG. 4. In this connection it should be noted that the elastomer 65 is confined and cannot flex radially inwardly because of the obstructing presence of the shaping wall 65 of bottom plate 60. The severe and abusive stressing or flexing thus occurring tends to cause a crack or split, such as that indicated at 72 in FIG. 4, in the wall 69 of the garter spring groove 68. Furthermore, the elastomer must distort at mouth 70 to permit the radially inward extreme of extension 66 to pass therethrough. As indicated above, this abusive treatment requires such great flexing of wall 69 that a split 72 often occurs immediately; in other instances, however, the actual split 72 develops only after the elastomer absorbs lubricant in use and undergoes swelling. In the latter instances, a bulge 76 is also usually discernible adjacent the split 72 upon disassembly for inspection. The benefits of the preferred construction of the present invention may be more easily appreciated by comparison of FIG. 4 with FIG. 6. Since many of the parts shown in FIG. 6 are similar to corresponding parts shown in FIG. 4, such parts are identified in FIG. 6 by the same number used in FIG. 4, except that the corresponding numbers in FIG. 6 are primed.

In FIG. 6, the bottom plate 60' includes an axially extending, collar-like projection 76, and the elastomer 65 forming the finished product surrounds the projection 76 on three sides. In the construction of FIG. 6, a radially inwardly extending projection 66' is disposed on the radially inward surface of the projection 76 of the bottom plate 60' rather than being formed from a portion of the top plate 58'. Thus, when top plate 58' is moved away axially as indicated by the arrow in FIG. 6 there is no significant resistance to separation of the upper mold half 58' from the lower mold half 60', therefore, there is normally no damage connected with the separation of the mold parts from the elastomer 65. When the resulting seal 10' is separated from bottom plate 60, the elastomer 65, and specifically the relatively elongated collar-like reversed or folded portion 78, is free to flex radially inwardly since no solid backing or support member is present radially inwardly thereof. Thus, all of the collar portion 78 can participate in accommodating the deformation of the mouth 70' around the relatively shallow, radially extending projection 66'. Thus, there is little or no tendency of any part of the elastomer 65 to split as a consequence of separation of the formed seal from either top plate 58' or bottom plate 60'.

In this connection, it is to be understood that the elastomer 65 is ordinarily shaped, upon molding, to such a configuration that the "at rest" elastomer would intrude into the space occupied by the shaft 35. Upon installation, the sealing lip 74 is necessarily stretched radially outwardly slightly to better assure a tight sealing fit. Of course, in a radially outwardly acting seal, opposite conditions would prevail. Likewise the width of the axially extending recess 40, in accordance with this invention, is slightly wider when the elastomeric sealing lip is in its "at rest" condition prior to installation since the gap between the side walls defining the recess 40 closes at least slightly upon installation and stretching of sealing lip 74 around shaft 35. Nonetheless, it is most preferred, in accordance with the present invention, that the width of the axially extending recess be less than the outside diameter of the garter spring 44 when the seal is in its installed position. It will be further noted that the depth of the spring-retaining groove 42, 68' is quite shallow, and is equal to or less than the radius of the spring-retaining groove in each instance.

In the embodiments illustrated, the provision of the reversed portion 28 of the sealing element provides positive retention of the spring 44 against axial movement into the interior of an assembly receiving seal. Therefore, the opening opposite the portion 28 normally faces the dry side or exterior of the area being sealed, and a post-assembly check will reveal the presence of the garter spring 44 in its desired position. However, the illustrated construction does provide a firm grip on the spring 44 by portions of the sealing element which are in radially facing relation. Accordingly, if the elements are sized for positive spring retention, the opening opposite the fold 28 might also face the interior of the region to be sealed, that is, the so-called wet side of the lip. It will thus be seen that the present invention provides a novel seal unit and method having a number of advantages and characteristics including those pointed out herein and others which are inherent in the invention. It is anticipated that certain modifications and variations of the illustrated construction will be apparent to those skilled in the art, and it is anticipated that such changes and modifications may be made without departing from the spirit of the invention or the scope of the appended claims.

I claim:

1. A shaft seal assembly for mounting between relatively movable first and second parts, and for retaining a fluid within a region to be sealed, said assembly including a relatively rigid casing element having a portion adapted for sealing engagement with said first part and a radially extending portion having a margin for receiving a portion of a seal body, and a seal body including a mounting portion bonded to said casing element margin, a primary lip portion having a seal band area defined by the convergence of a pair of frustoconical surfaces, an annular spring received within a spring-receiving groove formed within said body such that said spring is substantially radially aligned with said seal band area, and a radially flexible connecting portion extending between said primary lip portion and said mounting portion, whereby said seal band is substantially axially offset from said casing element margin, with one surface of said connecting portion overlying said spring, and a spring-receiving opening defined between said one surface and a portion of said spring receiving groove, said opening being directed axially away from the region being sealed and generally toward said casing element margin, said seal body further including a secondary lip portion, said secondary lip portion being formed as a continuation of said primary lip portion and extending radially and axially away from said spring receiving groove, said secondary lip portion also including a seal band portion defined by the convergence of a pair of frustoconical surfaces.

* * * * *